Patented Aug. 21, 1945

2,383,067

UNITED STATES PATENT OFFICE 2,383,067

LUMINESCENT CAST SYNTHETIC RESIN ARTICLES

Maurice L. Macht, Jersey City, and Malcolm M. Renfrew, Arlington, N. J., assignors to E. I. du Pont de Nemours & Company, Wilmington, Del., a corporation of Delaware No Drawing. Application July 7, 1942, Serial No. 450,078

5 Claims. (Cl. 252—301.3)

This invention relates to luminescent cast synthetic resin articles and, more particularly, to compositions comprising polymerized methyl methacrylate and adapted to be cast in molds to give luminescent articles.

Broadly, the idea of forming luminescent synthetic resin articles is not new. The procedures heretofore known have involved working the luminescent pigment with the synthetic resin on the rolls or in mixing apparatus, or in some other manner which involves subjecting the pigment to a thorough mechanical working. The articles made from compositions which have been thus processed, have not been marked by satisfactory luminescence and considerable effort has been made to devise some means of preparing synthetic resin articles with improved luminescence.

An object of the present invention is to provide a practical process of producing luminescent cast synthetic resin articles. A further object is to provide a composition for casting synthetic resin articles of improved luminescence, both with respect to the intensity and the duration of luminescence. Other objects of the invention will be apparent from the description given hereinafter.

The above objects are accomplished according to the present invention by preparing a composition comprising a luminescent pigment, polymerized methyl methacrylate, and a monomer from the group consisting of the esters of acrylic and methacrylic acids, the composition being pourable but sufficiently viscous to prevent the settling of the pigment, and then disposing the composition in a mold and subjecting it to polymerizing conditions until it is converted to a solid body.

In carrying out the invention it is important that the luminescent pigment shall not settle during the course of the polymerization of the composition in the mold and, yet, the composition must be pourable so that it can be readily disposed in the mold and take the shape thereof. It has been found that the viscosity of the composition should be between about 14 and 20 seconds at 25° C. to obtain this necessary result. All viscosities given herein are determined by the fall of an 0.25 inch diameter steel ball in a tube of suitable diameter and are expressed in terms of the time required for a fall of 10 inches at the temperature of operation.

The composition of the present invention may be made by suspending finely-divided polymerized methyl methacrylate either in monomeric methyl methacrylate or in a syrup of polymer dissolved in monomer. This use of finely-divided polymer suspended in monomer for casting compositions is disclosed in application Serial No. 410,652 of Macht and Stansbury, filed September 12, 1941, and assigned to the assignee of the present application.

It has been discovered that the composition of the present invention may be disposed in molds of any desired shape and then subjected to polymerizing conditions to convert it to a solid body having, at least relatively, a phenomenal increase both in the intensity and duration of luminescence, as compared to the luminescent synthetic resins heretofore known. To obtain such improved results the luminescent pigment should be incorporated into the casting composition with a minimum of mechanical working. It may be dry-mixed with the polymer component before admixture with the monomer component but it is preferred to disperse it in the monomer-polymer mixture with a minimum of mechanical action, i. e., by simple stirring, just prior to the disposal of the composition in the mold.

The following examples illustrate specific embodiments of the invention. All proportions are given throughout the specification and claims by weight unless otherwise specified:

Example I

Four hundred parts of polymerized methyl methacrylate containing 4% "C-18" alcohol (a mixture of alcohols of 16, 17, and, predominantly, 18 carbon atoms, derived from hydrogenated cocoanut oil esters) as a mold lubricant, and 0.8% benzoyl peroxide catalyst, in the form of particles which will pass a 20-mesh screen and be retained on a 40-mesh screen, dried for five days at 70° C., are mixed with 500 parts of monomeric methyl methacrylate with stirring for thirty minutes at room temperature. There are then added 100 parts of a commercial phosphorescent pigment containing strontium sulfide, which pigment is uniformly distributed throughout the mixture with a minimum of stirring. The solid particles show substantially no tendency to settle out when the mixture is permitted to stand undisturbed. The mixture is poured into a mold approximately 12 inches square and ⅜ inch thick formed by two smooth glass plates separated by a flexible gasket. The assembly is subjected to a temperature of 147° F. and a pressure of 150 pounds per square inch in an autoclave for sixteen hours, after which it is cooled and the resulting resin sheet removed from the cell or mold.

The sheet is irradiated for ten minutes with ultra-violet light and immediately thereafter placed in complete darkness at 25° C. It displays brilliant phosphorescence for a long period of time and is visible by its own radiation from a distance of greater than 6 feet at the end of eighteen hours. Phosphorescence is still detectable in the sheet at the end of one week.

Example II

A sheet of phosphorescent material is made as in Example I, except that the polymer is not subjected to a drying treatment. The intensity and duration of phosphorescence are slightly inferior to those of the sheet formed in Example I.

Example III

Five hundred parts of polymerized methyl methacrylate containing 4% "C-18" alcohol, 0.8% benzoyl peroxide, and 0.1% benzoin, in the form of particles which will pass a 20-mesh screen and be retained by a 40-mesh screen, dried for five days at 70° C., are mixed with 400 parts of monomeric methyl methacrylate, and 100 parts of a commercial phosphorescent pigment containing strontium sulfide. Stirring is continued for twenty minutes at room temperature, at the end of which time the viscosity of the mixture is 15 seconds at 25° C. The mixture is disposed in a mold 12 inches square and ½ inch thick, and polymerized under the influence of ultraviolet light.

After having been removed from the mold, the sheet is placed in a dark room until phosphorescence virtually ceases, following which it is exposed to sunlight (approximately 600 candle power) for two minutes, and again transferred to a dark room. At the end of one hour the sheet continues to emit sufficient radiation to make visible to the dark-accustomed eye objects fifteen feet away. At the end of eighteen hours, the sheet is visible by its own radiation at a distance of ten feet.

Example IV

Three hundred and fifty parts of polymerized methyl methacrylate containing 1.0% lauroyl peroxide catalyst, in the form of particles which will pass a 20-mesh screen and be retained by a 40-mesh screen, dried for four days at 70° C. are mixed with 550 parts of methyl methacrylate monomer, 50 parts methallyl methacrylate monomer, and 50 parts of a commercial phosphorescent pigment containing calcium sulfide, and stirred until the viscosity of the mixture reaches 14 seconds at 25° C. The mixture is hardened by being held for ten hours at 150° F. under pressure of 150 pounds per square inch in a cylindrical mold ½ inch in diameter and 12 inches long.

The resulting bar is subjected to irradiation from a 150 watt tungsten-filament bulb for one hour, and is thereupon disposed in an otherwise dark room. Eighteen hours after irradiation the phosphorescence of the bar is visible to the dark-accustomed eye.

Example V

Three hundred parts of a copolymer of methyl methacrylate and styrene in the ratio 9:1 by weight and containing 1.0% benzoyl peroxide, in the form of particles which will pass a 20-mesh screen and be retained by a 40-mesh screen, dried for seven days at 50° C., are stirred into 600 parts of a syrup of methyl methacrylate monomer containing 5% polymethyl methacrylate dissolved therein. At the end of fifteen minutes, there are added, with stirring, 100 parts of a commercial phosphorescent pigment containing strontium sulfide. The viscosity of the mixture is 14 seconds at 25° C. The mixture is polymerized in a mold two inches in diameter and one inch thick at 100° F. under pressure of 300 pounds per square inch.

The resulting chip continued to phosphoresce visibly to the naked eye twenty hours after irradiation for five minutes in strong sunlight.

Example VI

Four hundred parts of polymerized methyl methacrylate containing 0.5% of benzoyl peroxide catalyst, in the form of a powder which will pass a 40-mesh screen, are added to 500 parts of monomeric methyl methacrylate. The mixture is stirred for thirty minutes, at the end of which time it is substantially non-settling. 100 parts of a commercial phosphorescent pigment containing strontium sulfide are then added and uniformly dispersed throughout the mixture. The mixture is allowed to stand undisturbed for ten minutes, after which it is poured into a mold approximately 20 x 40 x ⅜ inches consisting of two smooth glass plates separated by a flexible gasket, and hardened by being subjected for several hours to a temperature of 142° F. and a pressure of 150 pounds per square inch in an autoclave. After cooling, the sheet is removed from the cell and trimmed in two dimensions to approximately the size 18 x 36 inches.

After irradiation with near ultra-violet light for ten minutes, the sheet phosphoresces so strongly that objects ten feet away are easily discernible by its light in an otherwise dark room. The sheet is visible by its own radiation from a distance of fifty feet at the end of eighteen hours. Phosphorescence can still be detected in the sheet at the end of five days. In both phosphorescent activity and retentivity, this material per unit size is not equal to that of Example II.

Example VII

Four hundred and twenty-five parts of polymerized methyl methacrylate containing 4% "C-18" alcohol and 0.8% benzoyl peroxide catalyst, dried three days at 70° C. are mixed with 525 parts of monomeric methyl methacrylate and 50 parts of a commercial phosphorescent pigment containing strontium sulfide. The mixture, which is substantially non-settling, is hardened in a sheet mold as in Example I. Phosphorescence is good, although slightly weaker than that of Example II.

Example VIII

Two hundred and seventy-five parts of polymerized methyl methacrylate containing 4% of "C-18" alcohol and 0.8% of benzoyl peroxide in the form of powder all of which will pass a 40-mesh screen, dried four days at 70° C. are mixed with 319 parts of monomer. There are added 6 parts of a commercial fluorescent pigment containing a zinc-cadmium sulfide combination. The mixture is stirred until the pigment is uniformly dispersed therethrough and is then poured into a cylindrical mold whose cavity is 16 inches long and ½ inch in diameter. The solid particles in the mixture show little tendency to settle out. Polymerization is effected as in Example I.

When the resulting rod is exposed to radiation having a preponderant wavelength of 3600 A., a brilliant yellow-orange fluorescence occurs. Quenching of fluorescence is almost instantaneous upon cessation of irradiation.

Example IX

Eighteen parts of polymerized methyl methacrylate powder which will pass a 40-mesh screen, are mixed with 3 parts of phosphorescent pigment and 9 parts of monomer. The mixture is quickly introduced in a poker-chip die and permitted to remain undisturbed for fifteen minutes, after which it is subjected to a pressure of 1900 pounds per square inch at 210° F. for twenty minutes. The properties of phosphorescence of the resulting article are definitely superior to those of a similar article formed by the compression molding of pigmented powder.

The above examples are merely illustrative and the invention broadly comprises a composition containing a luminescent pigment, polymerized methyl methacrylate, and a monomeric acrylate or methacrylate, the composition being pourable but sufficiently viscous to prevent the settling of the pigment under normal conditions of polymerization, and the disposing of such composition in a mold and subjecting same to polymerizing conditions to form a solid body.

There may be used substantially any pourable mixture of monomeric and solid polymeric methyl methacrylate from which the pigment, in the amount and physical condition employed, will not appreciably settle out under the polymerization conditions involved. The mixture consists of a dispersion of polymerized methyl methacrylate particles either in monomeric methyl methacrylate or in a syrup of polymeric methyl methacrylate dissolved in monomeric methyl methacrylate. Such a dispersion is conveniently formed by stirring a quantity of particles of polymer into monomer, stirring being continued for such a time and at such a rate as will permit dissolution of sufficient polymer to form a mixture of the proper viscosity.

As disclosed in said Macht and Stansbury application, Serial No. 410,652, and illustrated in several of the examples herein given, it is desirable, when using a dispersion of polymer particles in monomer as contrasted to a solution of polymer in monomer, to maintain the mixture, after being disposed in the mold, under non-polymerizing conditions for a short time before subjecting same to heat or other polymerizing influence. The purpose of this is to allow the polymer particles to become dissolved, at least partially, by the monomer and cause the mixture to become at least partially homogenous.

Regardless of whether the monomer-polymer composition is a dispersion of substantially undissolved polymer particles in monomer or a dispersion of the particles in a syrup of polymer dissolved in monomer, the composition must meet two requirements, it must be "pourable" to the extent that it can be disposed in a mold without undue difficulty and it must be sufficiently viscous so that the luminescent pigment will not settle during the polymerization of the composition. It has been found that a viscosity between about 14 seconds and 20 seconds, measured at 25° C., constitutes the normally useful viscosity range for the herein considered compositions. In most instances a composition having a viscosity of less than 14 seconds tends to permit settling of the pigment while compositions having a viscosity appreciably in excess of 20 seconds are usually inconvenient to handle.

The term "casting" is used herein in its broader sense as including operations which may be carried out under pressure although the composition at the time of being disposed in the mold is always "pourable" even though quite viscous. Obviously, molding operations employing solid granular compositions and the like are not included.

The precentage of polymer which may be used in the compositions herein considered, depends in part upon the amount of pigment present. The practical operative range of ratios of the combined weight of pigment and polymer to the weight of monomer lies between 40:60 and 70:30. The more narrow range of about 45:55 to 60:40 is preferred for ease of manipulation.

The size of the particles of polymer in the dispersion has considerable effect. While articles formed in accordance with this invention, substantially regardless of the particle size of the polymer, display properties of luminescence superior to those possible by any previously known techniques, it has been found that the best results are obtained by the use of particles of polymer which will pass a 20-mesh screen and be retained by a 40-mesh screen, and using the procedure described in the aforementioned copending application of Macht and Stansbury.

The polymer component of the composition may consist of polymerized methyl methacrylate, interpolymers of methyl methacrylate with minor proportions of other polymerizable compounds, or mixtures of polymerized methyl methacrylate with minor proportions of other organic polymers. Opaque compositions should be avoided. Plasticizers and other modifiers may be included provided only that they are not harmful to the pigments involved. One or more polymerization catalysts may be present.

The monomer component of the composition will ordinarily consist of monomeric methyl methacrylate although other acrylic and methacrylic acid esters such as methyl and ethyl acrylate and ethyl methacrylate and mixtures thereof with minor proportions of other non-acidic, polymerizable compounds are not precluded. Methacrylic acid and anhydride, which because of their acidic nature have a deleterious effect on most phosphorescent pigments, are not desirable for use in this invention, except perhaps in amounts of not more than about 0.5%.

Both polymer and monomer components should be substantially dry, since the presence of more than about 0.5% moisture by weight is detrimental to the intensity and duration of phosphorescence. Polymer which has been stored and exposed to a humid atmosphere, should be dried for several days at an elevated temperature. Monomer which has been stored in a closed container, will not ordinarily require drying, although in some cases this may be desirable.

As pigments, there may be used any of the commercially available luminescent pigments. Phosphorescent pigments containing strontium, zinc, calcium and cadmium sulfides have been found satisfactory. Good results have been obtained with zinc-cadmium sulfide fluorescent pigments. The selection of the pigment will be based in part upon the color of luminescence desired. Pigments are known which give rise individually to blue, orange, yellow or yellow-green luminescence. The pigments will ordinarily be so fine as to pass an 80-mesh screen, although pigments may be used which will pass a 20-mesh screen but be retained by a 40-mesh screen. The pigment should contain substantially no moisture. Compounds, such as iron salts, which tend to inhibit the luminescence of many pigments, should be avoided.

There will ordinarily be used not less than about 5% nor more than about 15% of phosphorescent pigment by weight of the total composition. With fluorescent pigments, the ordinary range is from about 0.5% to about 5%. When less than the smaller amount is employed, luminescence is ordinarily too weak for practical use, while no appreciable increase in luminescence results from the use of more than the larger amount.

There may be added to the composition polymerization catalysts, as well as plasticizers and other modifiers provided these are not acidic. To decrease the water sensitivity of the product, a small amount of a dry hygroscopic substance, which is preferably also an acid acceptor, may be incorporated in the mixture.

Polymerization of the monomer component may be effected in any manner suitable for forming cast shapes of good quality. Polymerizing by the influence of heat under carefully controlled conditions in the presence of a peroxide catalyst is satisfactory, although the reaction may be energized by visible or ultra-violet light, particularly when there is present a light-activating catalyst. The application of pressure during polymerization is advisable to minimize the formation of voids and bubbles. Perfect solid bodies may be obtained in the absence of superatmospheric pressure, however, where thin layers are polymerized relatively slowly.

The luminescent bodies may be of substantially any size or shape. It has been discovered, however, that relatively broad, thin bodies have the highest efficiency with respect to luminescence; for example, a thickness of 0.15 inch being optimum when using 10%, by weight of the composition, of a strontium sulfide pigment. Thinner shapes luminesce proportionately less, while an increase in thickness results in an almost negligible increase in luminescence.

Most of the phosphorescent pigments commercially available can be caused to phosphoresce by exposure to either visible or ultra-violet light. When visible light is used, the shorter wavelengths are to be preferred. Intensity and duration of phophorescence at a given temperature for a given pigment usually depend upon the period of exposure, where the period is relatively short. For most phosphorescent pigments there is, however, a saturation point beyond which continued exposure to the activiating radiation results in no change in properties of phosphorescence for any given sample. Fluorescent pigments are normally excited by ultra-violet light.

An important feature of this invention is the incorporation of the luminescent pigment in the casting composition with a minimum of mechanical working. It is preferred that the pigment be simply lightly stirred into the monomer-polymer mixture just prior to the disposal thereof in the mold; in that case, the pigment will be subjected to substantially no mechanical working. Alternatively, the pigment may be dry-mixed with the granular polymer before incorporation thereof with the monomer and the mixture of polymer and pigment is then stirred into the monomer. It has been found out that subjecting the pigment to any severe working has a very detrimental effect on its luminescent property so that working of the compositions containing the luminescent pigment on rolls, or in mixing or molding machines, must be avoided.

Phosphorescent resinous bodies formed as described herein have an intensity and retentivity of phosphorescence which has never before been equaled. It is an astonishing fact that concentrated pigment itself, undiluted with a carrier, does not equal the products of the present invention in intensity or retentivity of luminescence.

When there is employed, in accordance with the preferred technique of this invention, a polymer fraction which will pass a 20-mesh screen and be retained by a 40-mesh screen, the product is even more outstanding. Intensity of luminescence is often many times greater than that of the best samples otherwise obtainable and, in the case of phosphorescent materials, visible activity has been demonstrated for a period as long as ten days after irradiation.

As many apparently widely different embodiments of this invention may be made without departing from the spirit and scope thereof, it is to be understood that the invention is not limited to the specific embodiments thereof except as defined in the appended claims.

We claim:

1. A composition for the production of luminescent cast synthetic resin articles, which comprises a luminescent pigment and finely divided polymerized methyl methacrylate suspended in a liquid polymerizable vehicle comprising a monomer from the group consisting of the esters of acrylic and methacrylic acids, said composition being pourable but sufficiently viscous to prevent the settling of the pigment during the casting of the composition.

2. A composition for the production of luminescent cast synthetic resin articles, which comprises a luminescent pigment and finely divided polymerized methyl methacrylate suspended in a monomer from the group consisting of the esters of acrylic and methacrylic acids, the combined weight of said pigment and said polymerized methyl methacrylate amounting to 40%-70% by weight of said composition and the viscosity of said composition being between about 14 and 20 seconds at 25° C.

3. A composition for the production of luminescent cast synthetic resin articles, which comprises a luminescent pigment and polymerized methyl methacrylate of a particle size between 20-mesh and 40-mesh suspended in methyl methacrylate monomer, the combined weight of said pigment and said polymerized methyl methacrylate amounting to 45%-60% by weight of said composition and the viscosity of said composition being between about 14 and 20 seconds at 25° C.

4. A composition for the production of luminescent cast synthetic resin articles, which comprises 5%-15%, by weight of said composition, of a phosphorescent pigment and polymerized methyl methacrylate of a particle size between 20-mesh and 40-mesh suspended in methyl methacrylate monomer, the combined weight of said pigment and said polymerized methyl methacrylate amounting to 45%-60% by weight of said composition and the viscosity of said composition being between about 14 and 20 seconds at 25° C.

5. A composition for the production of luminescent cast synthetic resin articles, which comprises 0.5%-5%, by weight of said composition, of a fluorescent pigment and polymerized methyl methacrylate of a particle size between 20-mesh and 40-mesh suspended in methyl methacrylate monomer, the combined weight of said pigment and said polymerized methyl methacrylate amounting to 45%-60% by weight of said composition and the viscosity of said composition being between about 14 and 20 seconds at 25° C.

MAURICE L. MACHT.
MALCOLM M. RENFREW.